No. 743,822. Patented November 10, 1903.

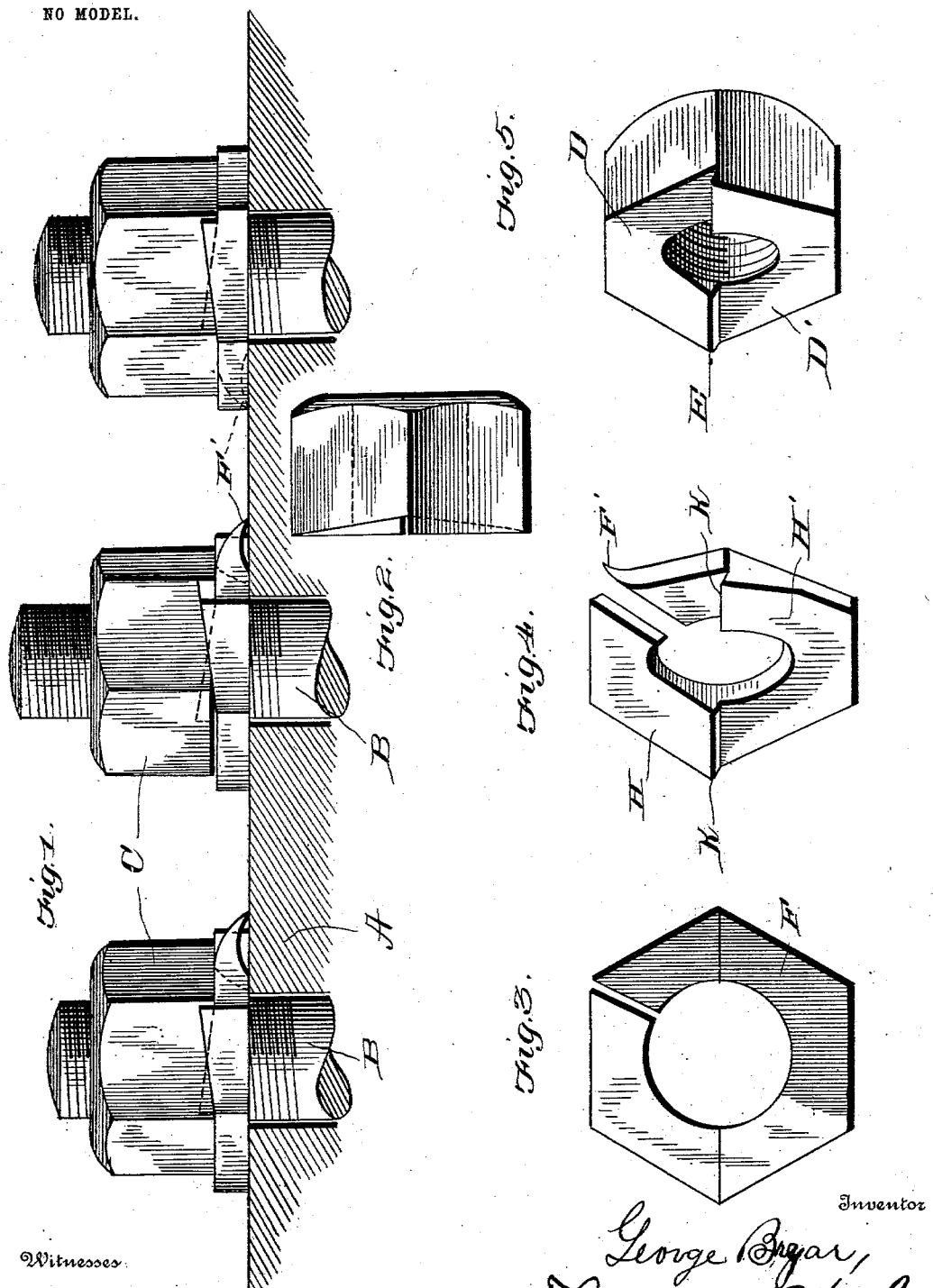

UNITED STATES PATENT OFFICE.

GEORGE BRYAR, OF ST. JOHN, CANADA, ASSIGNOR OF FIVE-EIGHTHS TO ROBERT L. JOHNSTON, JOHN WALSH, AND JOHN M. SMITH, OF ST. JOHN, CANADA.

LOCK-NUT AND WASHER.

SPECIFICATION forming part of Letters Patent No. 743,822, dated November 10, 1903.

Application filed March 20, 1903. Serial No. 148,748. (No model.)

*To all whom it may concern:*

Be it known that I, GEORGE BRYAR, a subject of the King of England, residing at St. John, in the county of St. John and Province of New Brunswick, Canada, have invented certain new and useful Improvements in Lock-Nuts and Washers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in nut-locks; and it consists in the provision of a split flexible washer which has one face adapted to be held flat against a plate to be bolted with one end bent to form a spur, while its nut-engaging face is provided with double inclines, each of which terminates in a shoulder adapted to interlock in a similar-shaped face of the nut, whereby as the nut is screwed down against the washer the same will be securely locked to the washer and the washer to the adjacent plate.

The invention consists, further, in various details, which will be brought out in the specification and which will be specifically defined in the appended claim.

My invention is illustrated in the accompanying drawings, which, with the letters of reference marked thereon, form a part of this application, and in which drawings—

Figure 1 is a sectional view through a plate, showing in elevation my improved nut-lock as applied thereto. Fig. 2 is an edge view of the nut. Fig. 3 is a plan view of the washer. Fig. 4 is a perspective view of the flexible washer, and Fig. 5 is a perspective view of the nut.

Reference now being had to the details of the drawings by letter, A designates a plate of any suitable kind through which bolts B are passed, and C designates a nut having a threaded bore adapted to fit the threaded portions of the bolt, and the under face of the nut is cut away, forming two inclined surfaces D and D′, clearly illustrated in Fig. 5 of the drawings. Each of said inclined surfaces terminates in a shoulder E, as illustrated, and F designates a flexible washer which has two inclined surfaces H and H′, which terminate in the shoulders K. One end of said washer is bent to form a spur F′, which is designed to be forced into the plate as the nut is screwed upon the washer. A slight space intervenes between the ends of the washer, as shown, and as the nut is forced down upon the washer the latter will yield and the shoulders on the washer will engage the shoulders on the adjacent face of the nut and the latter will be securely locked, the spur biting into the plate, preventing the washer from rotation.

Having thus fully described my invention, what I claim as new, and desire to secure by Letters Patent, is—

A nut-lock comprising a bolt, a split flexible washer, one end of said washer being bent to form a spur, and the nut-engaging face of the washer being formed with two oppositely-inclined surfaces, terminating in diametrically opposite shoulders, reversely arranged, combined with a nut having its washer-engaging face provided with two oppositely-inclined faces terminating in shoulders and conforming to the inclined surfaces of said washer, as shown and described.

In testimony whereof I hereunto affix my signature in presence of two witnesses.

GEORGE BRYAR.

Witnesses:
JOHN A. SINCLAIR,
K. J. MACRAE.